TRANSISTORIZED MULTIVIBRATOR

Filed Oct. 3, 1960 2 Sheets-Sheet 1

INVENTOR.
G. F. Cerofolini
BY
C. A. Gulbrandsen
Atty.

3,060,386

TRANSISTORIZED MULTIVIBRATOR

Gabriele F. Cerofolini, Milan, Italy, assignor to Automatic Electric Laboratories, Inc., Northlake, Ill., a corporation of Delaware Filed Oct. 3, 1960, Ser. No. 60,120
2 Claims. (Cl. 331—107)

This invention relates, in general, to transistorized multivibrator circuits, and in particular to an astable multivibrator utilizing transistors.

In the past, multivibrators have been used as a source of square waves. The basic components of these circuits are two amplifying devices, such as vacuum tubes or transistors, and two coupling capacitors. One of these amplifying devices remains conducting and the other is cut off until a capacitor reaches a given voltage, sufficient to drive the second device into conduction. The second device then causes the first to be cut off.

These astable or free-running devices, unequalled for their simplicity of design, suffer from two fundamental drawbacks. First, the square waves are not well shaped; and secondly, the frequency and the duty ratio are directly dependent on the external load. The relatively poor shape of the output waveforms is due to a slow rise-time, which results from the coupling capacitors being connected directly to the output. The frequency and duty ratio are largely determined by these capacitors and, therefore, are affected by the load.

The principal object of the invention is, therefore, to improve the output waveforms that are produced from a conventional transistorized multivibrator.

Another object of this invention is to make the frequency and the duty ratio independent of the load.

According to the invention, a transistorized multivibrator is provided using two transistors with a cross coupling network that is isolated from the output terminals by using diodes. Since the coupling capacitors are blocked from the load during the charging time, the rise time for the output voltage is considerably faster. Furthermore, the frequency and duty ratio are maintained independent of the load.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 4 wherein;

FIGS. 3 and 4 are graphs showing various waveforms of the respective embodiments.

A conventional transistor multivibrator and the wave forms thereof are shown by J. Millman and H. Taub in "Pulse and Digital Circuits" (McGraw Hill 1956) on page 603, FIGS. 18–38. While this conventional circuit arrangement is very simple, it suffers from two fundamental drawbacks, the impossibility of supplying well shaped square waves and the dependence of the frequency and the duty ratio on the loads. If these drawbacks cannot be tolerated, it has been necessary in the past to add a squarer stage. These drawbacks are essentially attributable to the permanent, and reversible, connections between the output leads and the timing capacitors. According to the invention, these drawbacks are overcome by an arrangement in which the outputs are disconnected from the capacitors during the charge time. Two embodiments of the invention are shown respectively in FIGS. 1 and 2. The first is suitable for applications in which the external loads draw negligible power, or at least, allow the collector voltages to rise rapidly and remain at the supply potential when the transistors are in the off state. The second, which uses two additional diodes, is suitable for use in all remaining applications. In both embodiments, essentially square waveforms are produced.

Figure 1:
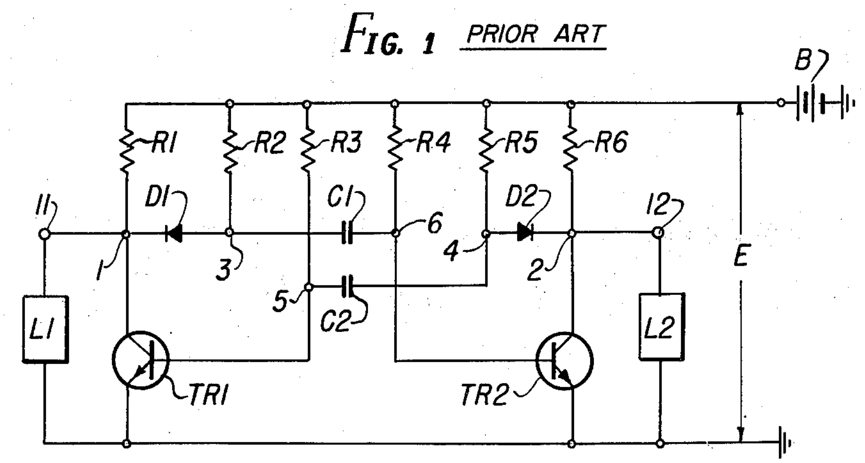
FIG. 1 PRIOR ART
FIG. 1 is a schematic diagram of a multivibrator according to the invention.

Referring to FIGURE 1, the multivibrator comprises the conventional circuit elements, namely, a pair of transistors TR1 and TR2, cross coupling capacitors C1 and C2, collector resistors R1 and R6 respectively, base resistors R3 and R4 respectively, and a connection from the resistors to a direct-current voltage source B. In addition, according to the invention, the circuit arrangement includes two blocking diodes D1 and D2, and two charging resistors R2 and R5. If the diodes and transistors are ideal, having zero resistance when conducting, and infinite resistance when non-conducting, the waveforms follow the patterns indicated in FIG. 3.

To summarize the operation briefly, assume that the transistor TR1 has just triggered to the conducting state, with capacitor C1 fully charged, and capacitor C2 discharged. Point 1 at the collector of transistor TR1 is therefore at ground potential, diode D1 conducts, and point 3 is thus brought to ground potential. Since capacitor C1 cannot instantaneously change its condition of charge, the base of transistor TR2 is forced to —E volts, and transistor TR2 is driven to cutoff. Point 5 is at substantially ground potential through the emitter-base junction of transistor TR1, and since capacitor C2 is discharged, point 4 is also at near ground potential. It is assumed that the resistance of load L2 is high compared to the value of resistor R6, and transistor TR2 is cutoff, so point 2 rises rapidly to a potential near the battery potential E, and diode D2 therefore becomes cutoff. Capacitor C2 then charges in series with resistor R5 and the emitter-base junction of transistor TR1 toward the battery voltage E. Since point 3 is at ground potential through diode D1 and transistor TR1, capacitor C1 discharges in series with resistor R4, so that the potential at point 6 rises from a voltage of —E toward the battery voltage E. At the instant that this potential reaches a value of zero, the emitter-base junction of transistor TR2 becomes forward biased, causing the transistor to become conducting.

A second half period of the multivibrator then occurs similar to the first. The change of potential at point 2 at the collector of transistor TR1 to be driven to a potential of —E to thereby cutoff that transistor. Capacitor C1 then charges in series with resistor R2 and the emitter-base junction of transistor TR2. Capacitor C2 discharges in series with resistor R3, point 4 being at ground potential. When point 5 reaches ground potential transistor TR1 conducts and thereby starts a new cycle. During the half period in which transistor TR1 is cutoff, diode D1 is reverse biased and isolates the load L1 from the charging current for capacitor C1.

The operation of the circuit will now be described in detail with reference to the voltage waveforms shown in FIG. 3.

Assume that at the instant $t0$, that the transistor TR1 has just triggered to the conducting state. Its collecor, connected to point V1 of the circuit, is therefore at ground potential, and diode D1 conducts. Since capacitor C1 cannot instantaneously change its condition of charge, the base of transistor TR2, connected to point V6 of the circuit, is forced to —E volts. Transistor TR2 is driven to cutoff, diode D2 becomes cutoff, and the collector of transistor TR2, connected to point V2 of the circuit, suddenly rises to a voltage E.

The graphs of FIG. 3 show the voltages at different points of the circuit. Graph V1 shows the voltage at point V1, connected to the collector of transistor TR1, diode D1, resistor R1, and output terminal 11. Graph V2 shows the voltage at point V2, connected to the collector of transistor TR2, diode D2, resistor R6, and output terminal 12. Graph V3 shows the voltage at point V3, connected to diode D1, resistor R2, and capacitor C1. Graph V4 shows the voltage at point V4, connected to diode D2, resistor R5, and capacitor C2. Graph V5 shows the voltage at point V5, connected to the base of transistor TR1, resistor R3, and capacitor C2. Graph V6 shows the voltage at point V6, connected to the base of transistor TR2, resistor R4, and capacitor C1.

As shown in FIG. 3, the voltages immediately following the instant $t0$ are ground potential at points V1, V3, V4, and V5, at point V2, the supply potential E, and at point V6, a voltage of —E.

Starting from the instant $t0$, the voltage at point V4 approaches the potential E at an exponential rate with a time constant T2 which is the product of the resistance of R5 and the capacitance of C2; and the voltage at point V6 approaches the potential E at an exponential rate with a time constant T4 which is equal to the product of the resistance of R4 and the capacitance of C1.

At the instant T1 at which point V6 reaches ground potential the circuit reverses by triggering transistor TR2 to its conducting state. Diode D2 conducts, the base of transistor TR1 is forced to a potential of —E volts and transistor TR1 is driven to cutoff. Diode D1 becomes cutoff and the collector potential of transistor TR1 at point V1 rises rapidly to the potential E. As shown in FIG. 3, the circuit conditions at the time immediately following the instant $t1$ are points V2, V3, V4, and V6 at ground potential; point V1 at the potential E, and point V5 at a potential of —E.

From the instant $t1$, the voltage at point V3 approaches E exponentially with a time constant T1 equal to the product of the resistance of R2 and the capacitance of C1; and the voltage at point V5 approaches E exponentially with a time constant T3 equal to the product of the resistance of R3 and the capacitance of C2. At the instant $t2$ at which the potential at V5 reaches ground potential the circuit again reverses and the conditions at the time immediately following $t0$ are restored. From this time the cycle is repeated.

Thus in the operation of the circuit there is a half period P1 during which transistor TR1 is cutoff and a half period P2 during which transistor TR2 is cutoff. The sum of these two half periods constitutes the total period P of the multivibrator. The half period P1 is the time required for the voltage V5 to change from the value —E to zero at an exponential rate with a time constant T3. Ground potential is at the middle value between the initial voltage —E and the supply voltage E. Solution of the exponential function shows that the period P1 is equal to 0.69 (T3). In like manner it may be seen that the half period P2 is equal to 0.69 (T4).

The duty ratio of the multivibrator may be defined as the ratio of the half period P1 to the total period P. The frequency of oscillation is equal to the reciprocal of the total period P.

In order to insure saturation of the transistors when conducting, the resistance of R1 and R2 in parallel should be greater than or equal to the resistance of R3 divided by beta, and the resistance of R5 and R6 in parallel should be greater than or equal to the resistance of R4 divided by beta; where beta is the minimum large signal current gain of the transistors. Additional conditions are that the collector resistors R1 and R6 should be as low as possible, in order to lower the multivibrator output impedance when the corresponding transistors are cutoff. Also the charging resistors R2 and R5 should be low enough to grant a practically complete charge of the timing capacitors at the instants at which the multivibrator changes its states. This condition is not indispensable but desirable since it permits the timing constants to depend only on the resistors R3 and R4 and the capacitors C1 and C2. The conditions are in opposition to one another, since to meet the first requirement it is impossible beyond certain limits to lower the value of a charging resistor without increasing the value of the corresponding collector resistor and vice versa; but a satisfactory comprise can easily be made.

From the foregoing analysis it follows that, if when the transistors are cutoff, the corresponding blocking diodes are also cutoff, the half periods P1 and P2, and consequently the frequency and duty ratio of the multivibrator are independent of the loads. Furthermore the multivibrator features square output waveforms with output impedances given by the resistances of R1 and R6 respectively.

Figure 2:
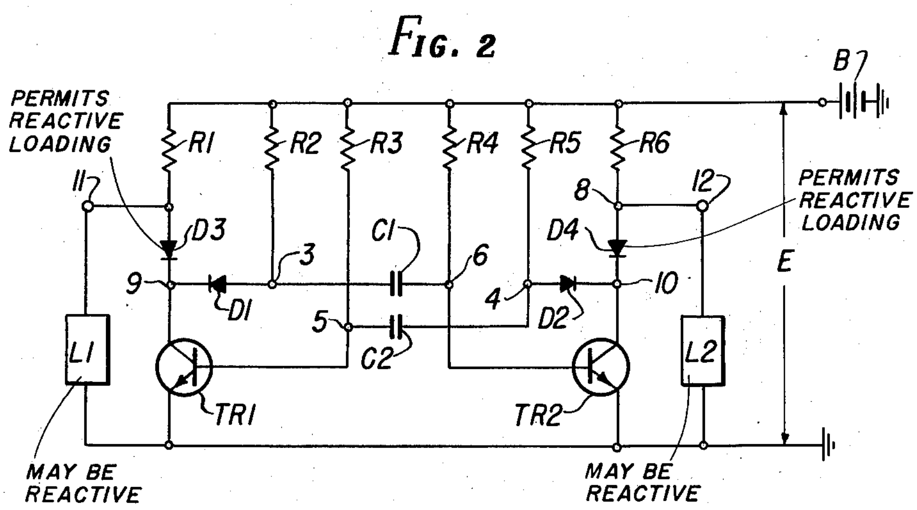
FIG. 2 is a schematic diagram of embodiment of the invention.

Concerning the multivibrator of FIG. 1, it should be noted, that in certain conditions of reactive load, the blocking diodes D1 and D2 can conduct even during part of the time during which the associated transistors TR1 and TR2 are cutoff. As an example of a loading condition under which D2 could conduct with the transistor TR2 cut off, suppose that load L2 is reactive and has a time constant which when taken with resistance R6 is longer than the time constant determined by resistance R5, the base to emitter impedance of transistor TR1, and capacitance C2. Under these conditions the potential at point 2 of FIGURE 1 may not rise immediately to near battery potential. Thus, point 4 of FIGURE 1 may become positive relative to point 2 and allow diode D2 to conduct while associated transistor TR2 remains cut off. This condition cannot occur when diodes D3 and D4 are added to the circuit since, even under the conditions specified above, diode D4 would be back biased thus, isolating the load, L2, from the timing circuit while transistor TR2 remains cut off. Under these conditions the waveforms at points V3 and V4 are affected by the loads, and the duty ratio will be load sensitive since the two half periods P1 and P2 depend upon the initial values at points V5 and V6 which, in turn, depend on the final values at points V3 and V4. This condition can be easily avoided by merely adding to the circuit two blocking diodes between the outputs and the collectors. Such an arrangement is shown by the embodiment of FIG. 2. It differs from the arrangement of FIG. 1 by the addition of diodes D3 and D4. These additional diodes provide a complete separation between the output leads and the timing capacitors during the time in which the transistors are cutoff, whatever the load conditions may be.

The analysis of this circuit arrangement is similar to that of the arrangement of FIG. 1, provided that the values taken for resistors R1 and R6 are ones which simulate the current drains actually flowing through diodes D3 and D4 when the corresponding transistors are conducting. The waveforms at points V3, V4, V5, and V6 are the same as those shown in FIG. 3. In FIG. 4 the graphs V7, V8, V9 and V10 show the voltages at points V7, V8, V9 and V10 of FIG. 2. These curves are for the case in which resistance loads L1 and L2 are connected between the output terminals 1 and 2 respectively to ground.

It will be appreciated that the foregoing analysis of both embodiments are based upon many approximations, especially about the properties of the transistors and the diodes. Nevertheless, measurements made on experimental multivibrators have shown that this simplified treatment is suitable even for design purposes, the degree of accuracy increasing with the value of the supply voltage E.

While I have described above the principles of my invention in connection with specific apparatus, it is to be clearly understood that this description is made only by way of example and not as a limitation to the scope of my invention.

What is claimed is:

1. A multivibrator comprising first and second transistors, each of said transistors having emitter, base and collector electrodes, first and second terminals for connection to opposite poles of a direct current source, resistance means connecting the collector and base electrodes of each of said transistors to said first terminal, connections from the emitter electrode of each of said transistors to said second terminal, a first junction point, first capacitive means connecting said first junction point to the base electrode of said second transistor, first diode means connecting said first junction point to the collector electrode of said first transistor, a second junction point, second capacitive means connecting said second junction point to the base electrode of said first transistor, second diode means connecting said second junction point with the collector electrode of said second transistor, resistance means connecting each of said junction points to said first terminal, first and second output connections, third diode means connecting said first output connection with the collector electrode of said first transistor, fourth diode means connecting said second output connection with the electrode of said second transistor, each of said diodes being poled to be forward biased during conduction of the respective associated transistor.

2. A multivibrator according to claim 1, wherein said third and fourth diodes are connected respectively in series with the resistance means between said first terminal and said collector electrodes, and said output connections are made respectively at the junctions of the third and fourth diodes with the corresponding resistance means.

References Cited in the file of this patent

UNITED STATES PATENTS 2,787,712 Priebe et al. -------------- Apr. 2, 1957